(12) United States Patent
Asano (10) Patent No.: US 7,174,478 B2
(45) Date of Patent: Feb. 6, 2007

(54) METHOD FOR RE-ASSIGNING DATA, APPARATUS FOR RECORDING DATA AND PROGRAM

(75) Inventor: Hideo Asano, Machida (JP)

(73) Assignee: International Business Machines Corporation, Armonk, NY (US)

(*) Notice: Subject to any disclaimer, the term of this patent is extended or adjusted under 35 U.S.C. 154(b) by 495 days.

(21) Appl. No.: 10/639,019

(22) Filed: Aug. 11, 2003

(65) Prior Publication Data

US 2004/0093551 A1    May 13, 2004

(30) Foreign Application Priority Data

Aug. 14, 2002    (JP)    ............... 2002-236261

(51) Int. Cl.
*G06F 11/00*    (2006.01)
(52) U.S. Cl. ............... 714/8; 714/7; 714/42; 714/54; 711/162; 710/5
(58) Field of Classification Search ............... 714/2, 714/5–8, 42, 54; 711/162; 710/5; 369/53.1
See application file for complete search history.

(56) References Cited

U.S. PATENT DOCUMENTS

| | | | | |
|---|---|---|---|---|
| 5,812,752 A * | 9/1998 | Yamada | ............... | 714/5 |
| 5,918,001 A * | 6/1999 | Ueno et al. | ............... | 714/8 |
| 6,061,805 A * | 5/2000 | Suzuki et al. | ............... | 714/2 |
| 6,101,574 A * | 8/2000 | Kumasawa et al. | ............... | 711/113 |
| 6,289,416 B1 * | 9/2001 | Fukushima et al. | ............... | 711/113 |
| 6,345,366 B1 * | 2/2002 | Asano et al. | ............... | 714/2 |
| 6,721,906 B1 * | 4/2004 | Hirashita et al. | ............... | 714/54 |
| 6,854,022 B1 * | 2/2005 | Thelin | ............... | 710/5 |
| 6,973,604 B2 * | 12/2005 | Davis et al. | ............... | 714/710 |
| 2004/0153745 A1 * | 8/2004 | Fukuhisa et al. | ............... | 714/7 |
| 2005/0177652 A1 * | 8/2005 | Cumpson et al. | ............... | 710/15 |

FOREIGN PATENT DOCUMENTS

| | | |
|---|---|---|
| JP | 07-006513 | 1/1995 |
| JP | 08-123626 | 5/1996 |
| JP | 09-035417 | 2/1997 |
| JP | 09-160728 | 6/1997 |
| JP | 2001-100935 | 4/2001 |
| JP | 2001-352475 | 12/2001 |
| JP | 2002-150699 | 5/2002 |

* cited by examiner

*Primary Examiner*—Robert W Beausoliel
*Assistant Examiner*—Emerson Puente
(74) *Attorney, Agent, or Firm*—Timothy N. Ellis (57) ABSTRACT

Data difficult to be written to a target sector (write) of a hard disk is recorded to a MRAM. The target sector (write) to which the write has been difficult is checked in a background of performing data write to the next target sector (write). When there is no error, the data stored in the MRAM is written to the target sector (write) of the hard disk. When there is any error, the data stored in the MRAM is written to an alternative sector of the hard disk. Data difficult to be read from a target sector (read) of the hard disk is recorded to the MRAM. The target sector (read) from which the read has been difficult is checked in a background of performing data read from the next target sector (read). When there is any error, the data stored in the MRAM is written to an alternative sector of the hard disk.

35 Claims, 7 Drawing Sheets

METHOD FOR RE-ASSIGNING DATA, APPARATUS FOR RECORDING DATA AND PROGRAM

BACKGROUND

This invention relates to a data recording apparatus, such as a hard disk drive apparatus. More particularly, this invention relates to a data re-assign method and its process when a sector from/to which read/write of data is difficult exists on a data track of a disk-shaped recording medium.

A hard disk drive apparatus is one of currently the most widespread external storage apparatuses for a computer apparatus. As well known, in a hard disk (also called a magnetic disk), which is a recording medium of the hard disk drive apparatus, sectors are made as the minimum recording units, which are obtained by partitioning a disk surface to tracks in the form of tree rings and further by radially separating the tracks.

All of these tracks are not always free from errors, and bad sectors from/to which data cannot be read/written may sometimes exist due to a scratch on the hard disk surface and adhesion of dust thereon. When the bad sectors are discovered in the manufacturing process of the hard disk, alternative sectors replacing the bad sectors that have occurred are allocated. Moreover, the bad sectors do not occur limited in the manufacturing process, but may sometimes occur during the use of the hard disk (product) after shipment thereof. In this case also, the alternative sectors replacing the bad sectors that have occurred are allocated. Allocation of the sectors in the manufacturing process of the product in a manner that only good sectors are used is referred to as "assign," and allocation of the alternative sectors after the shipment of the product is referred to as "re-assign."

The conventional hard disk drive apparatus is configured, when an access (read/write) from a host to a predetermined sector of the hard disk is difficult, to perform the re-assign (allocation of the alternative sectors) and to start an access to the next sector waiting for an end of the re-assign, that is, a completion of the data write to the alternative sectors.

However, the access to the next sector cannot be started until the re-assign is finished if the conventional technique as described above is used. Therefore, a technical problem has been seen, that latency occurs to bring about an instantaneous lowering in performance of the hard disk drive apparatus. Particularly, if the execution process of the re-assign becomes complicated, the above-described tendency becomes significant.

SUMMARY

The present invention was made in order to solve the technical problem described above. It is an object of the present invention to minimize the instantaneous performance lowering that occurs in the case of performing the re-assign.

It is another object of the present invention to reduce the number of re-assign.

The inventor of the present invention made an assiduous examination in order to solve the above-described technical problem. Then, the inventor acquired knowledge that the latency was able to be reduced by temporarily recording data to be re-assigned to a memory. Subsequently, the inventor reached an idea that it was preferable to use a non-volatile memory in consideration of a risk that data would disappear when a shutdown occurs due to some cause. Thus, the inventor resulted in inventing the present invention.

Specifically, a data re-assign method of the present invention comprises the steps of: recording data to a non-volatile memory when read/write of the data from/to a predetermined objective sector of a disk-shaped recording medium is difficult; detecting any error in the objective sector from/to which the read/write of the data is difficult; and recording, to another sector of the disk-shaped recording medium, the data recorded to the non-volatile memory when there is any error in the objective sector. Moreover, the method can further comprise the step of: recording, to the objective sector of the disk-shaped recording medium, the data recorded to the non-volatile memory when there is no error in the objective sector. Furthermore, the method can further comprise the step of: starting read/write of data from/to a next objective sector of the disk-shaped recording medium without waiting for a recording completion of the data to the objective sector after the data is recorded to the non-volatile memory.

Moreover, a data re-assign method of the present invention comprises the steps of: recording data to a non-volatile memory and another sector than a predetermined objective sector of a disk-shaped recording medium when read/write of the data from/to the objective sector is difficult; and erasing the data recorded to the non-volatile memory after recording the data to the another sector of the disk-shaped recording medium.

Here, each of the former and latter data re-assign methods can further comprise the step of: starting read/write of data from/to a next objective sector of the disk-shaped recording medium without waiting for a recording completion of the data to the another sector after the data is recorded to the non-volatile memory. Then, each method can be characterized in that a determination is made as to whether the read/write of the data from/to the predetermined objective sector of the disk-shaped recording medium is difficult based on the number of steps of ERP_(Error Recovery Procedures) executed for the objective sector.

Moreover, a data recording apparatus of the present invention comprises: primary re-assign means for recording data to a non-volatile memory when read/write of the data from/to a predetermined objective sector of a disk-shaped recording medium is difficult; error detecting means for detecting any errors in the objective sector from/to which the read/write of the data is difficult; and secondary re-assign means for recording, to another sector of the disk-shaped recording medium, the data recorded to the non-volatile memory when any error of the objective sector is detected by the error detecting means. Here, the apparatus can further comprise: rerecording means for recording, to the objective sector of the disk-shaped recording medium, the data recorded to the non-volatile memory when any error in the objective sector is not detected by the error detecting means. Then, the apparatus can be characterized in that the error detecting means and the secondary re-assign means operate in a background of any of data processing for another objective sector of the disk-shaped recording medium and an idle state of the disk-shaped recording medium. Here, the another objective sector includes the next objective sector and objective sectors after the next objective sector.

A data recording apparatus of the present invention comprises: recording means for recording data to a non-volatile memory and another sector than a predetermined objective sector of a disk-shaped recording medium when read/write of the data from/to the objective sector is difficult; and data erasing means for erasing the data recorded to the non-volatile memory after recording the data to the another sector of the disk-shaped recording medium. Here, the apparatus can be characterized in that the recording means operates in a background of any of data processing for the another objective sector of the disk-shaped recording medium and an idle state of the disk-shaped recording medium. Here, the another objective sector includes the next objective sector and objective sectors after the next objective sector.

Moreover, a data recording apparatus of the present invention comprises: a disk-shaped recording medium including a plurality of sectors from/to which data is readable/writable; and a non-volatile memory for temporarily recording data thereto when read/write of the data from/to a predetermined objective sector of the disk-shaped recording medium is difficult, the non-volatile memory being provided as an alternative area for the data read/written from/to the disk-shaped recording medium. Here, the non-volatile memory can be characterized in having a higher data write speed than the disk-shaped recording medium and having a larger recording capacity than the recording capacity of a unit sector of the disk-shaped recording medium. As such a non-volatile memory, for example, a magnetic random access memory (MRAM) is given. Then, the apparatus can be characterized in that the non-volatile memory is formed in a semiconductor device for controlling any of an operation of the disk-shaped recording medium and a read/write operation for the data from/to the disk-shaped recording medium.

Moreover, the present invention can be defined as a program for allowing a computer to have: a function of recording data to a non-volatile memory when read/write of the data from/to a predetermined objective sector of a disk-shaped recording medium is difficult; and a function of detecting any errors of the objective sector from/to which the read/write of the data is difficult; and a function of recording, to another sector of the disk-shaped recording medium, the data recorded to the non-volatile memory when there are any errors in the objective sector.

Furthermore, the present invention can also be categorized as a program for allowing a computer to realize: a function of recording data to a non-volatile memory and another sector than a predetermined objective sector of a disk-shaped recording medium when read/write of the data from/to the objective sector is difficult; and a function of erasing the data recorded to the non-volatile memory after recording the data to the another sector of the disk-shaped recording medium.

There is a mode, in which these programs allowed to be executed by the computer are stored in a storage medium storing therein the programs so as to be readable by this computer. For example, a CD-ROM (Compact Disc Read Only Memory) medium and the like correspond to such a storage medium. A mode is conceived, in which the programs are read by a CD-ROM reading apparatus in the computer, stored in various memories, for example, such as the hard disk in the computer, and executed. Moreover, another mode is conceived, in which these programs are provided to a notebook PC and a mobile terminal through a network, for example, by a program transmitting apparatus. It is sufficient if such a program transmitting apparatus may include a memory storing the programs therein and program transmitting means for providing the programs through the network.

DESCRIPTION OF THE DRAWINGS

For a more complete understanding of the present invention and the advantages thereof, reference is now made to the following description taken in conjunction with the accompanying drawings.

FIGS. 2(*a*) to 2(*d*) are explanatory views showing a configuration and the like of a magnetic random access memory (MRAM).

FIG. 3(*a*) is a schematic diagram showing a relationship between a hard disk and zones, FIG. 3(*b*) is a schematic diagram showing a relationship between the zones and sectors.

DESCRIPTION OF THE PREFERRED EMBODIMENTS

Embodiments will be described below in detail with reference to the accompanying drawings.

Embodiment 1

Figure 1:
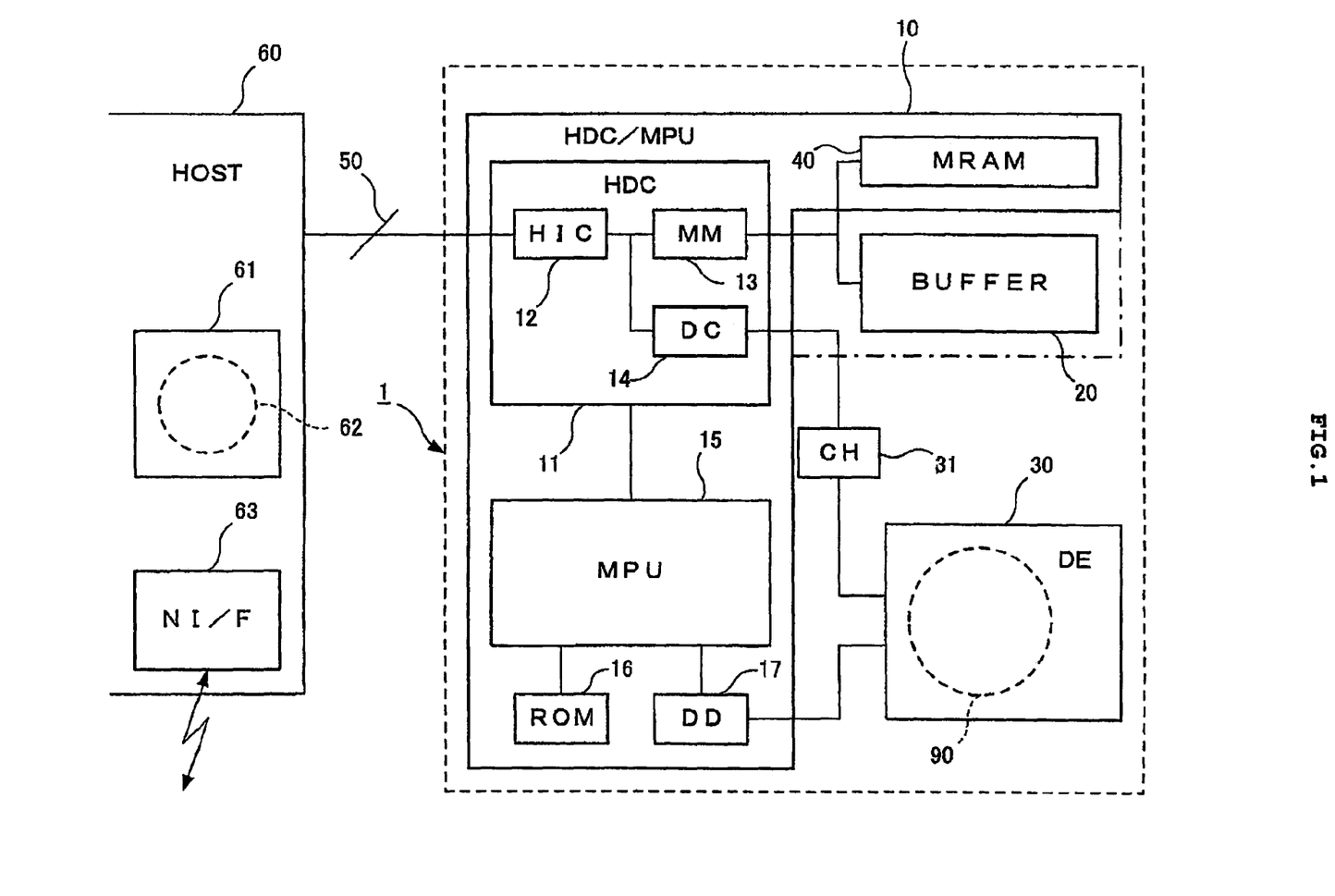
FIG. 1 is a block diagram showing the entire configuration of the hard disk drive apparatus according to Embodiment 1.

FIG. 1 is a block diagram illustrating a hard disk drive apparatus according to Embodiment 1. In FIG. 1, the hard disk drive apparatus (HDD) 1 is comprised of the HDC/MPU 10 including the hard disk controller (HDC) 11 and the MPU (Micro Processing Unit) 15; the buffer (BUFFER) 20, the disk enclosure (DE) 30, and the magnetic random access memory (MRAM, corresponding to a non-volatile memory) 40. The HDC/MPU 10 is connected to the host (HOST) 60 by the interface 50. Then, the host 60 includes the removal (removable) disk drive 61 and the network interface (NI/F) 63. The removal disk drive 61 can read data recorded to a non-rewritable removable disk 62 such as a CD-ROM and a DVD-ROM (DVD Read Only Memory), or can record data in a rewritable removal disk 62 such as a CD-RW (CD Rewritable) and a DVD-RAM (DVD Random Access Memory). The network interface (NI/F) 63 communicates with an external network and downloads various programs therefrom. Note that the removal disk 62 may be, for example, a MO (Magneto Optical Disk) and the like besides the above-described optical disks.

In the HDC/MPU 10, the HDC 11 includes the host interface controller (HIC) 12, the memory manager (MM) 13, and the data controller (DC) 14. The HDC 11 and the MPU 15 are connected to each other. The ROM 16 and the device driver (DD) 17 are connected to the MPU 15. The DC 14 is connected to the channel (CH) 31 that performs data conversion and the like for reading/writing data from/to the hard disk 90 in the DE 30. Meanwhile, the DD 17 includes a spindle driver for controlling rotation of a spindle (not shown) of the hard disk 90 (corresponding to a disk-shaped recording medium) provided in the DE 30, and a VCM driver for driving a voice coil motor (VCM: not shown) provided in a magnetic head (not shown) that performs read/write of data from/to the hard disk.

In the HDD 1, when writing data thereto, the data transferred thereto from the host 60 through the I/F 50 is once stored in the BUFFER 20 via the HIC 12 and the MM 13. Thereafter, the data once stored in the BUFFER 20 is written into the hard disk 90 via the MM 13 and the DC 14 in accordance with an instruction of the MPU 15. On the other hand, when reading the data stored in the hard disk 90, the data is once stored in the BUFFER 20 via the DC 14 and the MM 13 in accordance with an instruction of the MPU 15, and thereafter, the data is outputted to the HOST 60 via the MM 13 and the HIC 12. Allocation of alternative sectors to be described later and the write/read of the data thereto/therefrom are realized by which the MPU 15 interprets and executes firmware stored in the ROM 16 and the BUFFER 20. Note that the firmware stored in the BUFFER 20 is recorded to the hard disk 90 and adapted to be read out to the BUFFER 20 during power on sequence. It is possible to rewrite this firmware by the host 60. The acquisition technique of the firmware by the host 60 can include read thereof from the removal disk 62 by the removal disk drive 61 and download thereof from the outside through the NI/F 63.

Figure 2:
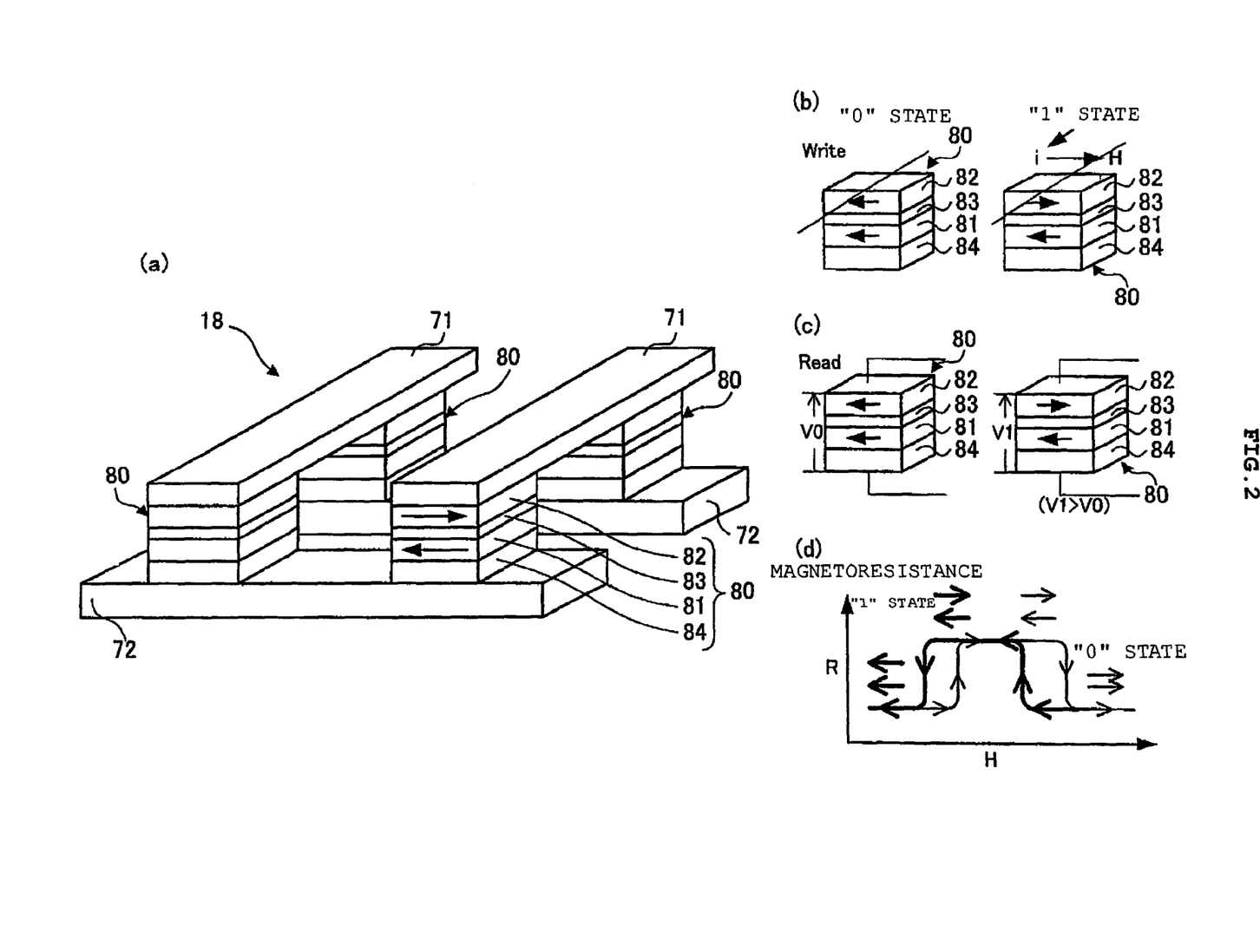

Next, the MRAM 40 used in this embodiment will be described in detail. FIGS. 2(a) to 2(d) illustrate the basic structure and the like of the MRAM 40. In FIG. 2(a), the MRAM 18 has a structure in which magnetic tunnel junction devices (MTJ devices) 80 are arranged on intersections of the bit lines 71 and the word lines 72, which are arrayed in matrix. The basic configuration of each MTJ device 80 is composed of a three-layer structure of a ferromagnetic layer/a non-magnetic layer/a ferromagnetic layer, in which the ferromagnetic layers 81 and 82 composed of ferromagnets are divided by the non-magnetic layer 83 composed of a non-magnet.

Here, for the ferromagnetic layers 81 and 82, transition metal magnetic elements (Fe, Co and Ni) or alloys thereof (CoFe, CoFeNi, NiFe and the like) are used. Usually, the ferromagnetic layers 81 and 82 have a thickness of 10 nm or less. Memory information is stored by use of spin directions of the ferromagnets, and "1" and "0" of the memory information can be defined depending on whether the spin directions of the two ferromagnets are relatively parallel or anti-parallel. Usually, a value of an electric resistance when the relative spin directions of the two ferromagnets are anti-parallel is larger compared with that when the spin directions are parallel. From this fact, "1" is defined in the case of the anti-parallel, and "0" is defined in the case of the parallel, and thus "1" and "0" can be read by utilizing this magnetoresistance effect. Therefore, the antiferromagnetic layer 84 composed of an antiferromagnet (FeMn, IrMn, PtMn, NiMn or the like) is attached to one ferromagnetic layer 81 so as to fix and not to easily invert the spin direction thereof. Here, the ferromagnetic layer 81 attached with the antiferromagnetic layer 84 is called a fixed ferromagnetic layer, and the other ferromagnetic layer 82 is called an oriented ferromagnetic layer. With regard to the memory information, "1" and "0" are defined depending on whether the oriented ferromagnetic layer 82 is parallel or anti-parallel to the fixed ferromagnetic layer 81.

Moreover, the write of the memory information to the MTJ device is performed in the following manner. As shown in FIG. 2(b), the spin of the MTJ device 80 on the intersection of the bit line 71 and the word line 72 is inverted by a synthetic magnetic field made by pulse currents flown therethrough, and "1" and "0" are specified by the direction of the inverted spin. Meanwhile, the read of the memory information from the MTJ device 80 is performed in the following manner. As shown in FIG. 2(c), an electric current is flown through the MTJ device 80, and the magnetoresistive effect (MR effect) is utilized, and thus it is measured whether the resistance of the MTJ device 80 (voltages generated on both ends of the MTJ device 80) is large or small. Specifically, "0" is defined when the voltage is V0, and "1" is defined when the voltage is larger than V0. Note that FIG. 2(d) shows relationships between the magnetic field H and the magnetoresistance R when the memory information is "1" and "0."

The MRAM 18 formed of the above-described MTJ devices 80 has the following advantages. First, the MRAM 18 is a magnetic memory device, and therefore, the memory information is not erased only by turning off a power supply unlike a DRAM (Dynamic Random Access Memory) and a SRAM(Static Random Access Memory), which are widely used in general. Thus, a memory hold operation is unnecessary. Then, the MRAM 18 has both the high integration of the DRAM and the high-speed of the SRAM. Moreover, the MRAM 18 can also save power consumption because the power supply becomes unnecessary for the memory holding operation. Furthermore, in comparison with a rewritable non-volatile memory existing heretofore such as a flash memory (EEPROM), the MRAM 18 improves rewrite cycling endurance and write speed significantly. The write speed to the MRAM 18 is extremely higher than the write speed to the hard disk 90. Further, the MRAM 18 has another advantage in resisting [alpha] particles (cosmic rays).

Then, a further advantage of the MTJ devices 80 constituting the MRAM 18 is in that the MTJ devices 80 can be easily formed in other devices by applying a so-called semiconductor process. Particularly, in this embodiment, the MRAM 18 is formed simultaneously with fabrication of a chip of the HDC 11, so that the MRAM 18 is embedded in the HDC 11, thus achieving miniaturization of the apparatus. The MTJ devices 80 can be fabricated in three-layer and four-layer metal, and in a space of a wiring layer appropriately. Moreover, the MTJ devices 80 can also be dispersed three-dimensionally in the HDC 11. Furthermore, also with regard to the manufacturing technology of the MTJ devices 80, the current manufacturing technology of a CMOS (Complementary Metal Oxide Semiconductor) can be used as it is. It is sufficient if the memory capacity of the MRAM 18 may be integer multiples of 512 bytes (about several kilobytes in total), of which size corresponds to one sector (unit sector) in the hard disk 90 to be described later. At the minimum, it is sufficient if the memory capacity may be 512 bytes equal to one sector in size.

Moreover, though the HDC/MPU 10 and the BUFFER 20 are constituted separately from each other in this embodiment, the BUFFER 20 may be formed in the HDC/MPU 10.

Figure 3:
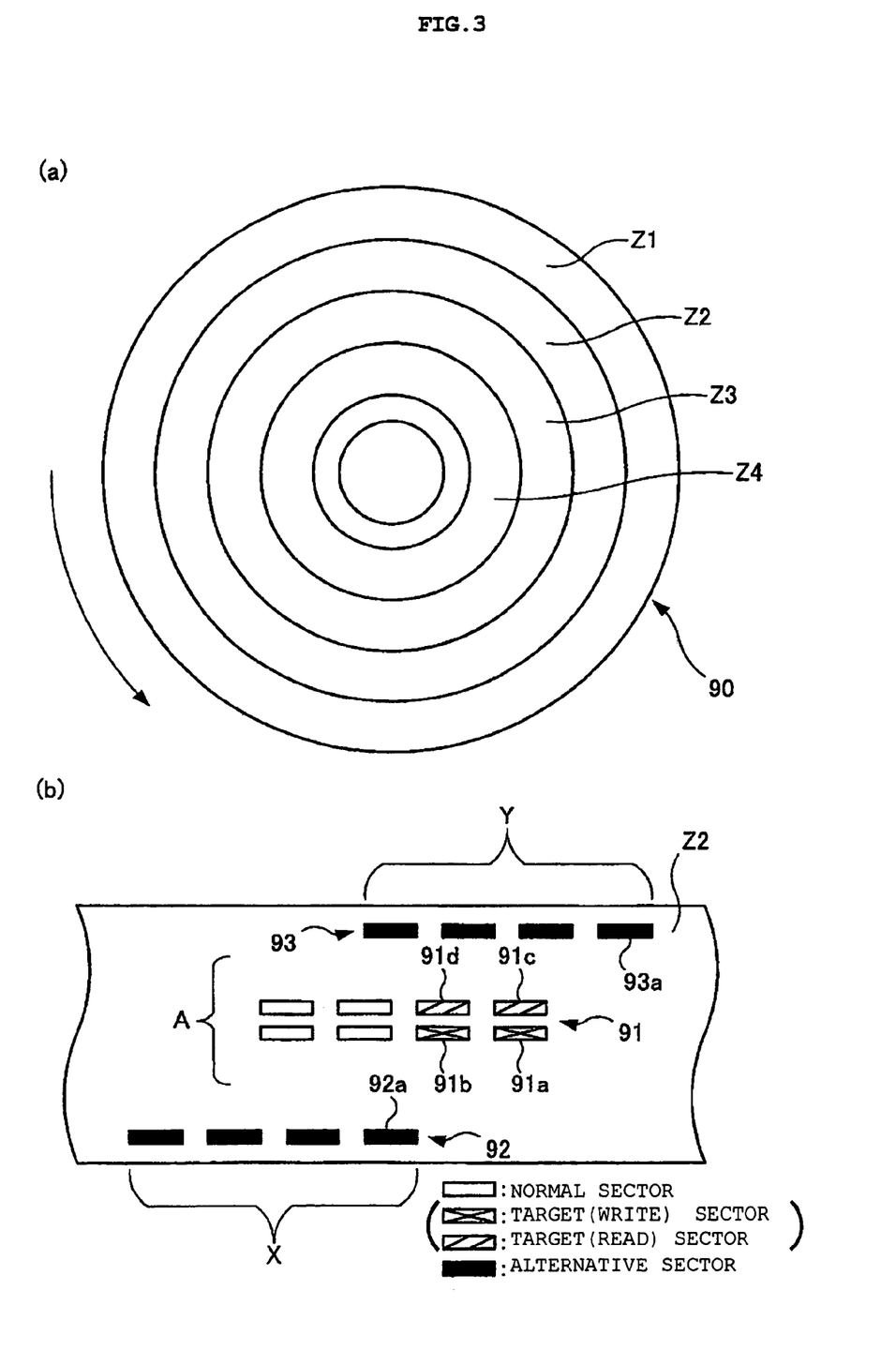

FIGS. 3(a) and 3(b) are views explaining the hard disk 90 according to this embodiment. FIG. 3(a) shows the hard disk 90 adopting a zone bit recording system. This hard disk 90 is partitioned to the zones Z1 to Z4 in the circumferential direction. Note that this number of zones does not reflect that of an actual hard disk, but the zones are schematically shown. This hard disk 90 is arranged in single or plural in the DE 30 (refer to FIG. 1).

FIG. 3(b) is a partially enlarged diagram of the zone Z2. Note that this enlarged diagram illustrates the ring-shaped zone Z2 linearly. In FIG. 3(b), the normal sector area A including a plurality of the normal sectors 91 is formed in the center portion of the zone Z2. The inside alternative sector area X including a plurality of the alternative sectors 92 is formed in the inner circumferential side of the zone Z2. The outside alternative sector area Y including a plurality of the alternative sectors 93 is formed in the outer circumferential side of the zone Z2. Each of the sectors has a capacity of 512 bytes.

Figure 4:
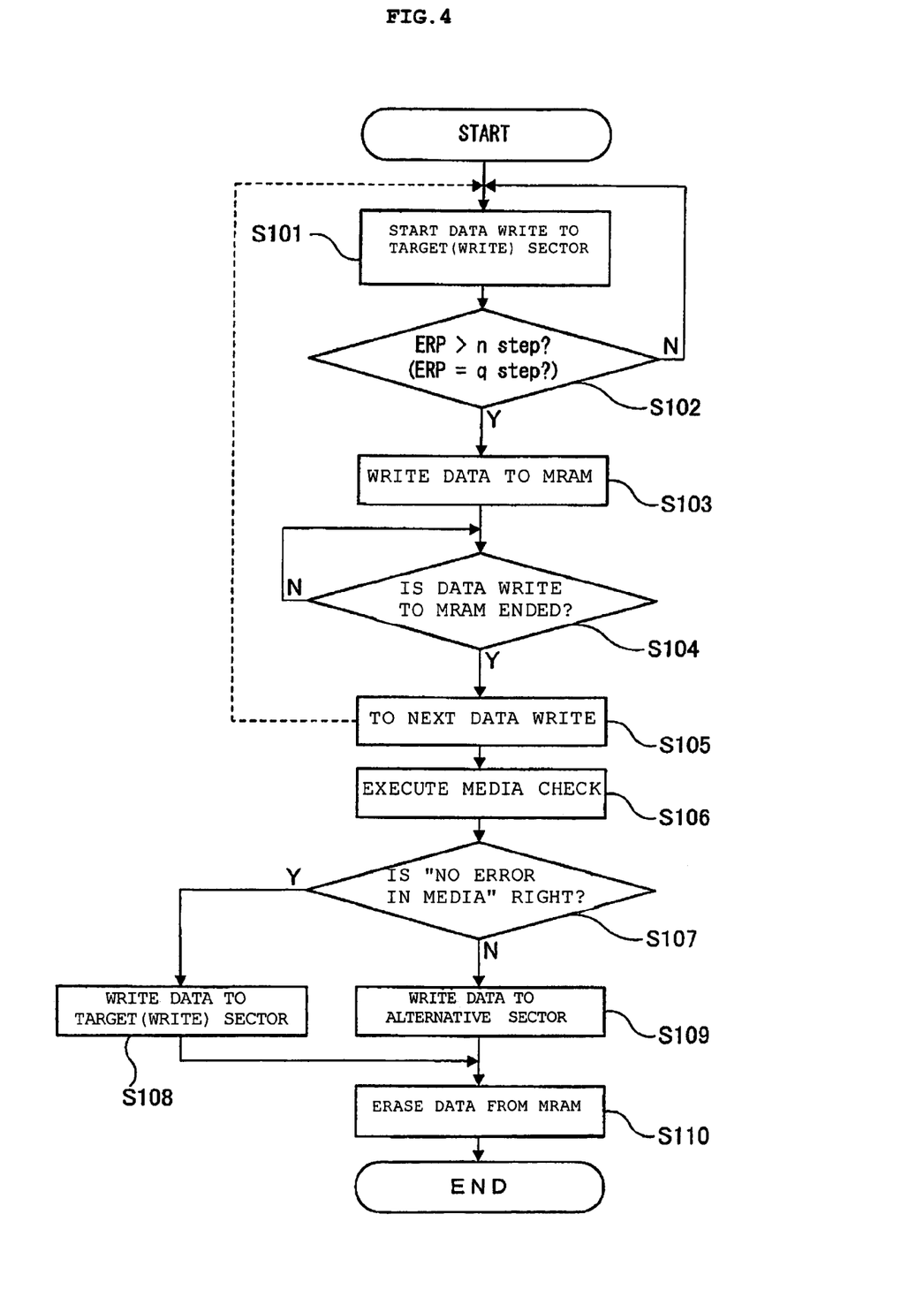
FIG. 4 is a flowchart showing a data write process in Embodiment 1.

FIG. 4 is a flowchart explaining a data write operation to the hard disk 90.

First, a predetermined sector of the normal sectors 91 in the normal sector area A of the hard disk 90 is set as the target sector (write) 91a (corresponding to an objective sector), and data stored in the BUFFER 20 is started to be written to the target sector (write) 91a (Step S101). Note that a LBA (Logical Block Addressing) system is adopted as an addressing system for the sectors in this embodiment, and in accordance therewith, the target sector (write) 91a is determined in the HDC/MPU 10.

Next, it is determined whether or not the number of steps of ERP (Error Recovery Procedures) generated in the case of the data write to the target sector (write) 91a has exceeded the defined value n defined previously (Step S102). The ERP during the write operation is one that changes and adjusts one by one standard write conditions defined among the hard disk 90, a magnetic head (not shown) and the HDC 11 and executes rewrite of the data. For example, the write conditions are: an amount of off-track, which is a shift amount between the center of the magnetic head and the center of a track; a value of a bias current given to a MR (magnetoresistance) device in the case of providing the MR device to the magnetic head; an automatic gain control (AGC) for fixing an amplitude of reproduction signals; a speed and a gain of a PLL (Phase Locked Loop) circuit for stabilizing a sampling frequency (setting a following speed at a predetermined rate); and the like, all of which are to be adjusted. Usually, a plurality of error recovery steps are registered as the ERP, and these steps are executed in a predetermined order. Then, the rewrite is made by each step, and the ERP is ended at the time when the rewrite succeeds.

Here, when the number of steps of the ERP exceeds the defined value n, data to be written to the target sector (write) 91a is written to the MRAM 18 (Step S103). Specifically, the data to be written to the hard disk 90 is retreated to the MRAM 18 (primary re-assign). In this case, the write action of the data to the MRAM 18 is notified to the HDC 11. Here, that the number of steps of the ERP exceeds the defined value n means that it has taken time to write the data to the target sector (write) 91a, that is, means that it has been difficult to write the data thereto.

By these Steps S101 to S103, the process for recording the data to the MRAM 18 (corresponding to the non-volatile memory) will be executed when it is difficult to write the data to the target sector (write) 91a (corresponding to the objective sector) of the hard disk 90 (corresponding to the disk-shaped recording medium). Then, in Step S102, a process for determining the difficulties of the data write to the target sector (write) 91a of the hard disk 90 based on the number of steps of the ERP executed for the target sector (write) 91a will be executed.

On the other hand, when the number of steps of the ERP is equal to/less than the defined value n, the process returns to Step S101, and the data write to the next target sector (write) 91b is started.

Next, it is determined whether or not the data write to the MRAM 18 has been ended (Step S104). If the data write is ended, the process returns to Step S101, and the data write to the next target sector (write) 91b is started (Step S105). On the other hand, when the data write is not ended, the end of the data write is awaited.

By these Steps S104 and S105, a process for starting to read/write the data from/to the next target sector (write) 91b (corresponding to the next objective sector) of the hard disk 90 (corresponding to the disk-shaped recording medium) will be executed without awaiting the recording completion of the data to the target sector (write) 91a after recording the data to the MRAM 18 (corresponding to the non-volatile memory).

Then, in a state where the data write to the MRAM 18 has been ended and the data write to the next target sector (write) 91b has been started, a media check for the hard disk 90 is executed in the background of this data write operation (Step S106). This media check is performed for the target sector (write) 91a to which the data write has been difficult.

Next, it is determined whether or not any error exists in the media of the hard disk 90 (Step S107). Note that the error of the media implies that a defect occurs in the target sector (write) 91a because scratches occur in the target sector (write) 91a and dust is attached thereto, leading to the incapability of writing the data thereto on and after.

By these Steps S106 and S107, a process for detecting the error of the target sector (write) 91a (corresponding to the objective sector) to which the data write is difficult will be executed.

Here, when there has been no error in the media of the hard disk 90 (when there has been no defect in the target sector (write) 91a), the data that has been stored in the MRAM 18 is rewritten to the target sector (write) 91a (Step S108). Specifically, the data that has been retreated to the MRAM 18 is returned to the hard disk 90.

In other words, by Step S108, a process for recording the data that has been recorded in the MRAM 18 (corresponding to the non-volatile memory) to the hard disk 90 (corresponding to the disk-shaped recording medium) will be executed when there is no error in the target sector (write) 91a (corresponding to the objective sector).

Note that, as causes of making it difficult to write the data temporarily, for example, there are an impact applied from the outside, dust temporarily sandwiched between the magnetic head and the target sector (write) 91a and the like. These are matters of a kind which will be solved if no impact comes to be applied thereto and the sandwiched dust is removed. Hence, the writing difficulty is not always caused by a defect that has occurred in the target sector (write) 91a.

On the other hand, when there has been any error in the media of the hard disk 90 (when there has been a defect in the target sector (write) 91a), a sector to which the data is written is set at a predetermined alternative sector in the inside alternative sector area X or outside alternative sector area Y of the hard disk 90. The predetermined alternative sector corresponds to another sector, that is, corresponds to the alternative sector 92a in the inside alternative sector area X in this embodiment. Then, the data that has been stored in the MRAM 18 is written to the alternative sector 92a (Step S109). Specifically, the data that has been retreated to the MRAM 18 is returned to the hard disk 90 (secondary re-assign).

Specifically, by Step S109, a process for recording the data that has been recorded to the MRAM 18 (corresponding to the non-volatile memory) to the alternative sector 92a (corresponding to another sector) of the hard disk 90 (corresponding to the disk-shaped recording medium) will be executed when there is an error in the target sector (write) 91a (corresponding to the objective sector).

Then, after Step S108 or S109, the data is erased from the MRAM 18 (Step S110), and the re-assign operation is ended.

In this embodiment, a constitution has been adopted, in which, when it is difficult to write data to the target sector (write) 91*a* of the hard disk 90, the data is once stored in the MRAM 18, and the data stored in the MRAM 18 is rewritten to the hard disk 90 in the background of the data write to the next target sector (write) 91*b*. Here, the data write speed to the MRAM 18 is significantly higher than the data write speed to the hard disk 90. Therefore, a time required for storing the data in the MRAM 18 can be saved. Consequently, the latency becomes extremely short, and an instantaneous lowering in performance can be controlled.

Moreover, when rewriting the data stored in the MRAM 18 to the hard disk 90, a constitution has been adopted, in which the state of the target sector (write) 91*a* to which the data must have been written is first checked, then the data is written to the target sector (write) 91*a* when there in no error, and the data is written to the alternative sector 92*a* only when there is an error. Therefore, wasteful consumption of the alternative sectors 92 and 93 can be suppressed. Moreover, seen from another viewpoint, it is made possible to suppress the number of alternative sectors prepared beforehand. Furthermore, the reliability of the apparatus can be enhanced.

Furthermore, in this embodiment, the data that has been difficult to be written to the target sector (write) 91*a* is once stored in the MRAM 18 that is the non-volatile memory. Therefore, even if the power supply is disconnected in this state, the data can be left in the MRAM 18, and the reliability can be enhanced.

Note that, in the above-described process, the difficulties of the data write to the target sector (write) 91*a* have been determined whether or not the number of steps of the ERP in the write operation has exceeded the predetermined defined value n. However, the data write conditions in the respective steps of the ERP include various conditions from easy one to difficult one with regard to the data write, and the execution order thereof has no relationship with the difficulties of the data write. Accordingly, for example, as shown by the equation in the parentheses of Step S102 in FIG. 4, a step (for example, q-th step) in which a very special data write condition (condition where the data write is difficult) is set may be registered beforehand, and the data write to the MRAM 18 may be allowed when the data write succeeds under the write condition in the q-th step. Here, for the order q of the step, it is possible to set plural numbers beforehand.

Figure 5:
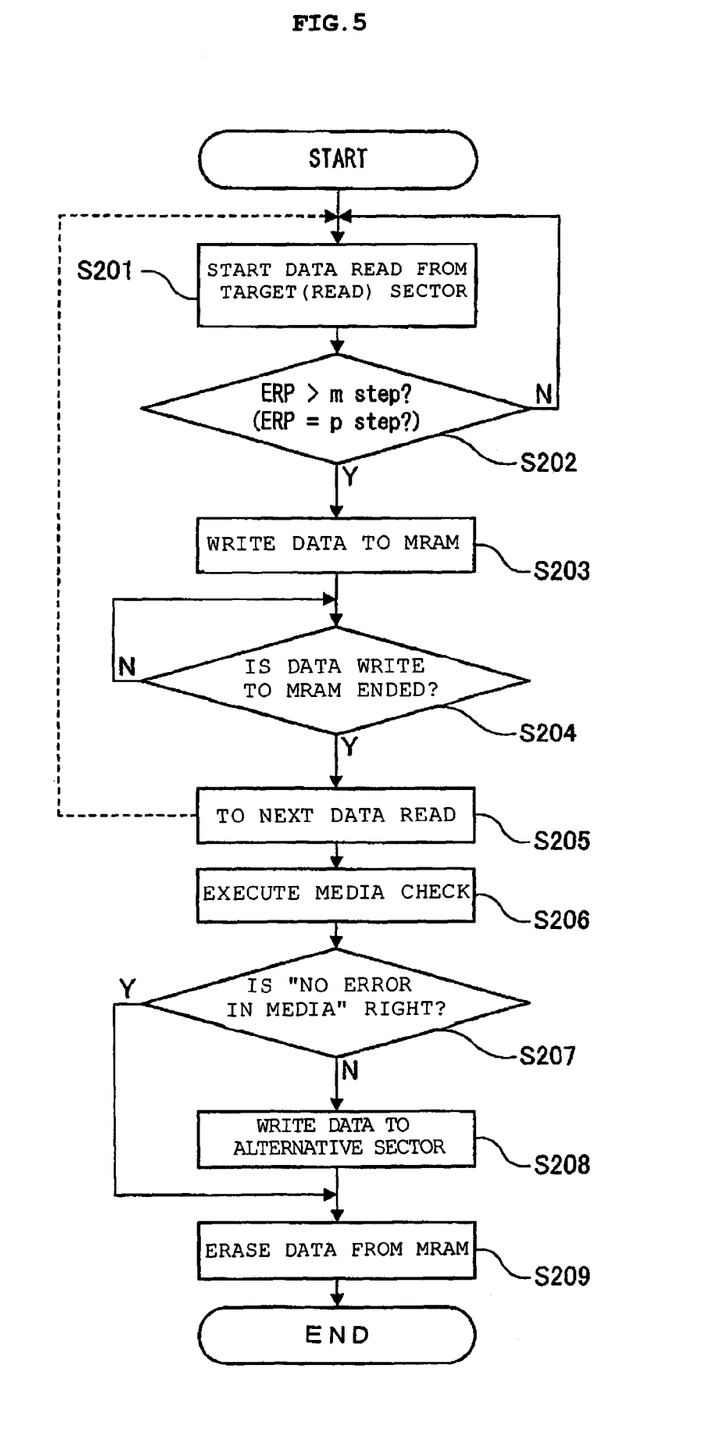
FIG. 5 is a flowchart showing a data read process in Embodiment 1.

FIG. 5 is a flowchart explaining an operation when the data stored in the hard disk 90 is read.

First, a predetermined sector in the normal sectors 91 of the normal sector area A of the hard disk 90 is set as the target sector (read) 91*c* (corresponding to the objective sector), and the data stored in the target sector (read) 91*c* is started to be read (Step S201).

Next, it is determined whether or not the number of steps of the ERP generated when reading the data from the target sector (read) 91*c* has exceeded the defined value m defined beforehand (Step S202). The ERP under the read operation executes reread by adjusting standard read conditions defined among the hard disk 90, the magnetic head (not shown) and the HDC 11 one by one. For example, the read conditions are: the amount of off-track, which is a shift amount between the center of the magnetic head and the center of a track; the value of the bias current given to the MR (magnetoresistance) device in the case of providing the MR device to the magnetic head; the automatic gain control (AGC) for fixing the amplitude of the reproduction signals; the speed and gain of the PLL (Phase Locked Loop) circuit for stabilizing the sampling frequency (setting the following speed at a predetermined rate); and the like, all of which are to be adjusted. Usually, a plurality of error recovery steps are registered as the ERP, and these steps are executed in a predetermined order. Then, the reread is made by each step, and the ERP is ended at the time when the reread succeeds.

Here, when the number of steps of the ERP exceeds the defined value m, the data read from the target sector (read) 91*c* is written to the MRAM 18 (Step s203). Specifically, the data read from the hard disk 90 is retreated to the MRAM 18 (primary re-assign). In this case, the write action of the data to the MRAM 18 is notified to the HDC 11. Here, that the number of steps of the ERP exceeds the defined value m means that it has taken time to read the data from the target sector (read) 91*c*, that is, means that it has been difficult to read the data therefrom.

By these Steps S201 to S203, the process for recording the data to the MRAM 18 (corresponding to the non-volatile memory) will be executed when it is difficult to read the data from the target sector (read) 91*c* (corresponding to the objective sector) of the hard disk 90 (corresponding to the disk-shaped recording medium). Then, in Step S202, a process for determining the difficulties of the data read from the target sector (read) 91*c* of the hard disk 90 based on the number of steps of the ERP executed for the target sector (read) 91*c* will be executed.

On the other hand, when the number of steps of the ERP is equal to/less than the defined value m, the process returns to Step S201, and the data read from the next target sector (read) 91*d* is started.

Next, it is determined whether or not the data write to the MRAM 18 has been ended (Step S204). If the data write is ended, the process returns to Step S201, and the data read from the next target sector (read) 91*d* is started (Step S205). On the other hand, when the data write is not ended, the end of the data write is awaited.

By these Steps S204 and S205, a process for starting to read/write the data from/to the next target sector (read) 91*d* (corresponding to the next objective sector) of the hard disk 90 (corresponding to the disk-shaped recording medium) will be executed without awaiting the recording completion of the data to the target sector (read) 91*c* after recording the data to the MRAM 18 (corresponding to the non-volatile memory).

Then, in a state where the data write to the MRAM 18 has been ended and the data read from the next target sector read 91*d* has been started, a media check for the hard disk 90 is executed in the background of this data read operation (Step S206). This media check is performed for the target sector (read) 91*c* from which the data read has been difficult.

Next, it is determined whether or not any error exists in the media of the hard disk 90 (Step S207). Note that the error of the media implies that a defect occurs in the target sector (read) 91*c* because scratches occur in the target sector (read) 91*c* and dust is attached thereto, leading to the incapability of reading the data therefrom on and after.

By these Steps S206 and S207, a process for detecting the error of the target sector (read) 91*a* (corresponding to the objective sector) from which the data read is difficult will be executed.

Here, when there has been no error in the media of the hard disk 90 (when there has been no defect in the target sector (read) 91*c*), the process directly proceeds to Step S209. Note that as causes of making it difficult to read the data temporarily, similarly to the case of the data write, for example, there is an impact applied from the outside, dust temporarily sandwiched between the magnetic head and the target sector (read) 91*c* and the like. These are matters of a kind which will be solved if no impact comes to be applied thereto and the sandwiched dust is removed. Hence, the reading difficulty is not always caused by the defect that has occurred in the target sector (read) 91*c*.

On the other hand, when there has been any error in the media of the hard disk 90 (when there has been a defect in the target sector (read) 91*c*), a sector to which the data is written is set at a predetermined alternative sector in the inside alternative sector area X or outside alternative sector area Y of the hard disk 90. The predetermined alternative sector corresponds to another sector, that is, corresponds to the alternative sector 93*a* in the outside alternative sector area Y in this embodiment. Then, the data that has been stored in the MRAM 18 is written to the alternative sector 93*a* (Step S208). Specifically, the data that has been retreated to the MRAM 18 is returned to the hard disk 90 (secondary re-assign).

Specifically, by Step S208, a process for recording the data that has been recorded to the MRAM 18 (corresponding to the non-volatile memory) to the alternative sector 93*a* (corresponding to another sector) of the hard disk 90 (corresponding to the disk-shaped recording medium) will be executed when there is an error in the target sector (read) 91*c* (corresponding to the objective sector).

Then, the data is erased from the MRAM 18 (Step S209), and the re-assign operation is ended.

In this embodiment, a constitution has been adopted, in which, when it is difficult to read data from the target sector (read) 91*c* of the hard disk, the read data is once stored in the MRAM 18, and the data stored in the MRAM 18 is rewritten to the hard disk according to needs in the background of the data reading from the next target sector (read) 91*d*. Here, the data write speed to the MRAM 18 is significantly higher than the data write speed to the hard disk 90. Therefore, a time required for storing the data in the MRAM 18 can be saved. Consequently, the waiting time becomes extremely short, and the instantaneous lowering in performance can be controlled.

Moreover, when rewriting the data stored in the MRAM 18 to the hard disk 90, a constitution has been adopted, in which the state of the target sector (read) 91*c* from which the data has been read is first checked, then the data stored in the target sector (read) 91*c* is used as it is thereafter when there is no error, and the data is written to the alternative sector 93*a* only when there in an error. Therefore, the wasteful consumption of the alternative sectors 92 and 93 can be suppressed. Moreover, seen from another viewpoint, it is made possible to suppress the number of alternative sectors prepared beforehand. Furthermore, the reliability of the apparatus can be enhanced.

Furthermore, in this embodiment, the data that has been difficult to be read from the target sector (read) 91*c* is once stored in the MRAM 18 that is the non-volatile memory. Therefore, even if the power supply is disconnected in this state, the data can be left in the MRAM 18, and the reliability can be enhanced.

Note that, in the above-described process, the difficulties of the data read from the target sector (read) 91*c* have been determined whether or not the number of steps of the ERP in the read operation has exceeded the predetermined defined value m. However, the data read conditions in the respective steps of the ERP include various conditions from easy one to difficult one with regard to the data read similarly to the above-described data write conditions, and the execution order thereof has no relationship with the difficulties of the data read. Accordingly, for example, as shown by the equation in the parentheses of Step S202 in FIG. 5, a step (for example, p-th step) in which a very special data read condition (condition where the data read is difficult) is set may be registered beforehand, and the data write to the MRAM 18 may be allowed when the data read succeeds under the read condition in the p-th step. Here, for the order p of the step, it is possible to set plural numbers beforehand.

Embodiment 2

This embodiment is approximately similar to Embodiment 1. However, this embodiment is different from Embodiment 1 in that the data write to the MRAM 18 and the data write to the hard disk 90 are adapted to be started simultaneously with each other when the data write to the hard disk 90 or the data read therefrom is difficult. Note that the basic configuration of the hard disk drive apparatus in this embodiment is the same as that of Embodiment 1, and therefore, detailed description thereof will be omitted.

Figure 6:
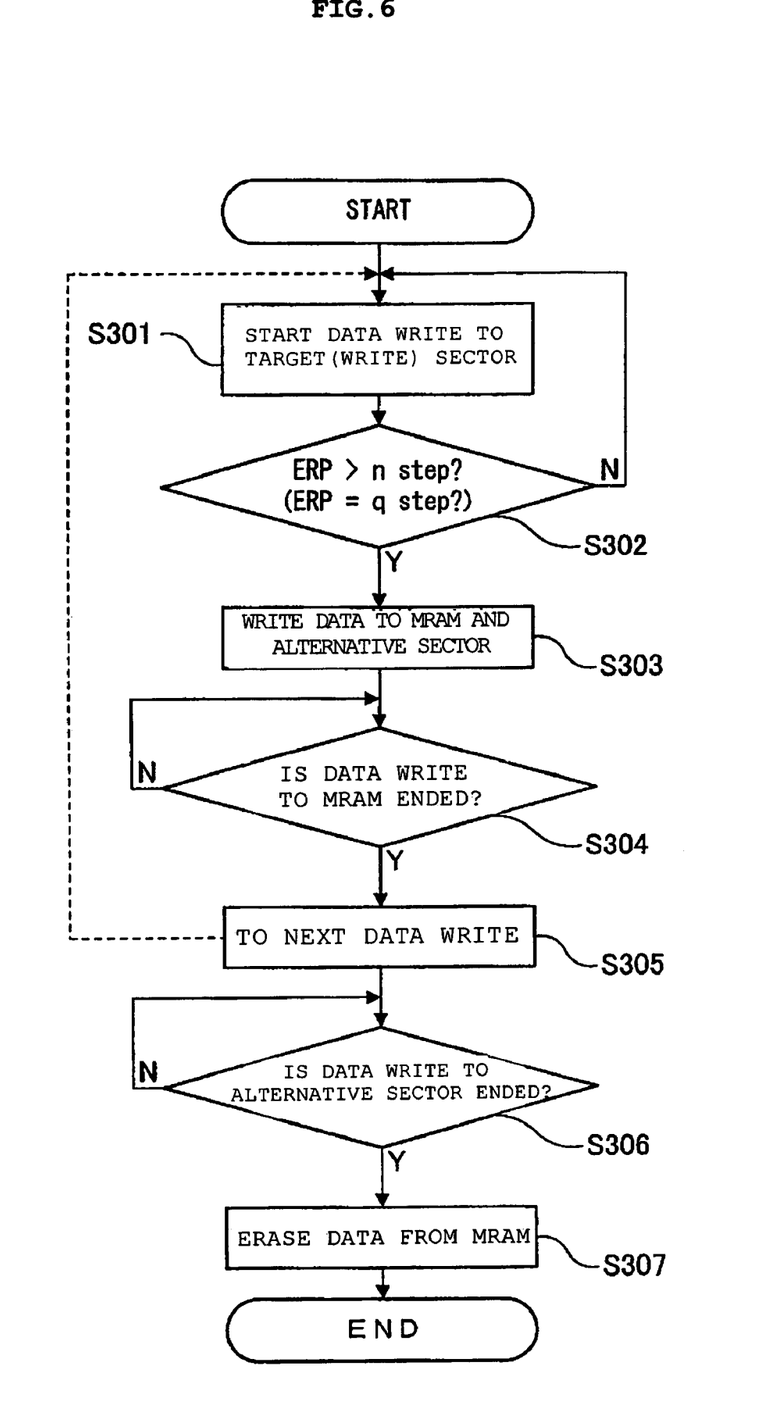
FIG. 6 is a flowchart showing a data write process in Embodiment 2.

FIG. 6 is a flowchart explaining a data write operation to the hard disk 90.

First, a predetermined sector of the normal sectors 91 in the normal sector area A of the hard disk 90 is set as the target sector (write) 91*a* (corresponding to an objective sector), and data stored in the BUFFER 20 is started to be written to the target sector (write) 91*a* (Step S301).

Next, it is determined whether or not the number of steps of ERP (Error Recovery Procedures) generated in the case of the data write to the target sector (write) 91*a* has exceeded the defined value n defined previously (Step S302).

Here, when the number of steps of the ERP exceeds the defined value n, data to be written to the target sector (write) 91*a* is written to the MRAM 18 and to a predetermined alternative sector (corresponding to another sector, that is, the alternative sector 92*a* in the inside alternative sector area X in this embodiment) (Step S303). Specifically, the data to be written to the target sector (write) 91*a* is re-assigned simultaneously to the MRAM 18 and the alternative sector 92*a*. In this case, the write action of the data to the MRAM 18 and the alternative sector 92*a* is notified to the HDC 11.

By these Steps S301 to S303, the process for recording the data to the MRAM 18 (corresponding to the non-volatile memory) and the alternative sector 92*a* (corresponding to another sector) of the hard disk 90 (corresponding to the disk-shaped recording medium) will be executed when it is difficult to write the data to the target sector (write) 91*a* (corresponding to the objective sector) of the hard disk 90.

On the other hand, when the number of steps of the ERP is equal to/less than the defined value n, the process returns to Step S301, and the data write to the next target sector (write) 91*b* is started.

Next, it is determined whether or not the data write to the MRAM 18 among the data write thereto and to the alternative sector 92*a* has been ended (Step S304). If the data write to the MRAM 18 is ended, the process returns to Step S301, and the data write to the next target sector (write) 91*b* is started (Step S305). On the other hand, when the data write is not ended, the end of the data write is awaited. Note that the data write to the alternative sector 92*a* goes on as it has been.

By these Steps S304 and S305, a process for starting to read/write the data from/to the next target sector (write) 91*b* (corresponding to the next objective sector) of the hard disk 90 (corresponding to the disk-shaped recording medium) will be executed without awaiting the recording completion of the data to the alternative sector 93*a* after recording the data to the MRAM 18 (corresponding to the non-volatile memory).

Then, in a state where the data write to the MRAM 18 has been ended and the data write to the next target sector (write)

91*b* has been started, it is determined whether or not the write to the alternative sector 92*a* has been ended (Step S306). When the data write to the alternative sector 92*a* has been ended, the data is erased from the MRAM 18 (Step S307), and the re-assign operation is ended. On the other hand, when the data write to the alternative sector 92*a* has not been ended, the end of the data write is awaited.

By these Steps S306 and S307, a process for erasing the data recorded to the MRAM 18 (corresponding to the non-volatile memory) will be executed after recording the data to the alternative sector 92*a* (corresponding to another sector) of the hard disk 90 (corresponding to the disk-shaped recording medium).

In this embodiment, the following constitution has been adopted. When it is difficult to write data to the target sector (write) 91*a* of the hard disk 90, the data is written to the alternative sector 92*a* as well as to the MRAM 18. At the time when the data write to the MRAM 18 is ended, the data write to the next target sector (write) 91*b* is started, and the data write to the alternative sector 92*a* is made to go on in the background of the above data write. Here, the data write speed to the MRAM 18 is significantly higher than the data write speed to the hard disk 90. Therefore, a time required for storing the data in the MRAM 18 can be saved. Consequently, the latency becomes extremely short, and an instantaneous lowering in performance can be controlled.

Moreover, the data is written to the MRAM 18 and the alternative sector 92*a*, whereby the data write to the alternative sector 92*a* can be progressed to some extent at the time when the data write to the MRAM 18 is ended. Therefore, the time for the data write to the alternative sector 92*a* in the background of the data write operation to the next target sector (write) 91*a* can be shortened, thus making it possible to further control the instantaneous lowering in performance.

Furthermore, in this embodiment, the data that has been difficult to be written to the target sector (write) 91*a* is written to the alternative sector 92*a* and the MRAM 18. Therefore, even if the power supply is disconnected during the data write to the alternative sector 92*a*, the data can be left as far as such disconnection occurs after the data write to the MRAM 18 is ended, and the reliability can be enhanced.

Note that, as a matter of course, a step (for example, q-th step) in which a very special data write condition (condition where the data write is difficult) is set may be registered beforehand in the respective steps of the ERP as shown by the equation in the parentheses of Step S302 in FIG. 6, and the data write to the MRAM 18 and the alternative sector 92*a* may be allowed when the data write succeeds under the write condition in this q-th step.

Figure 7:
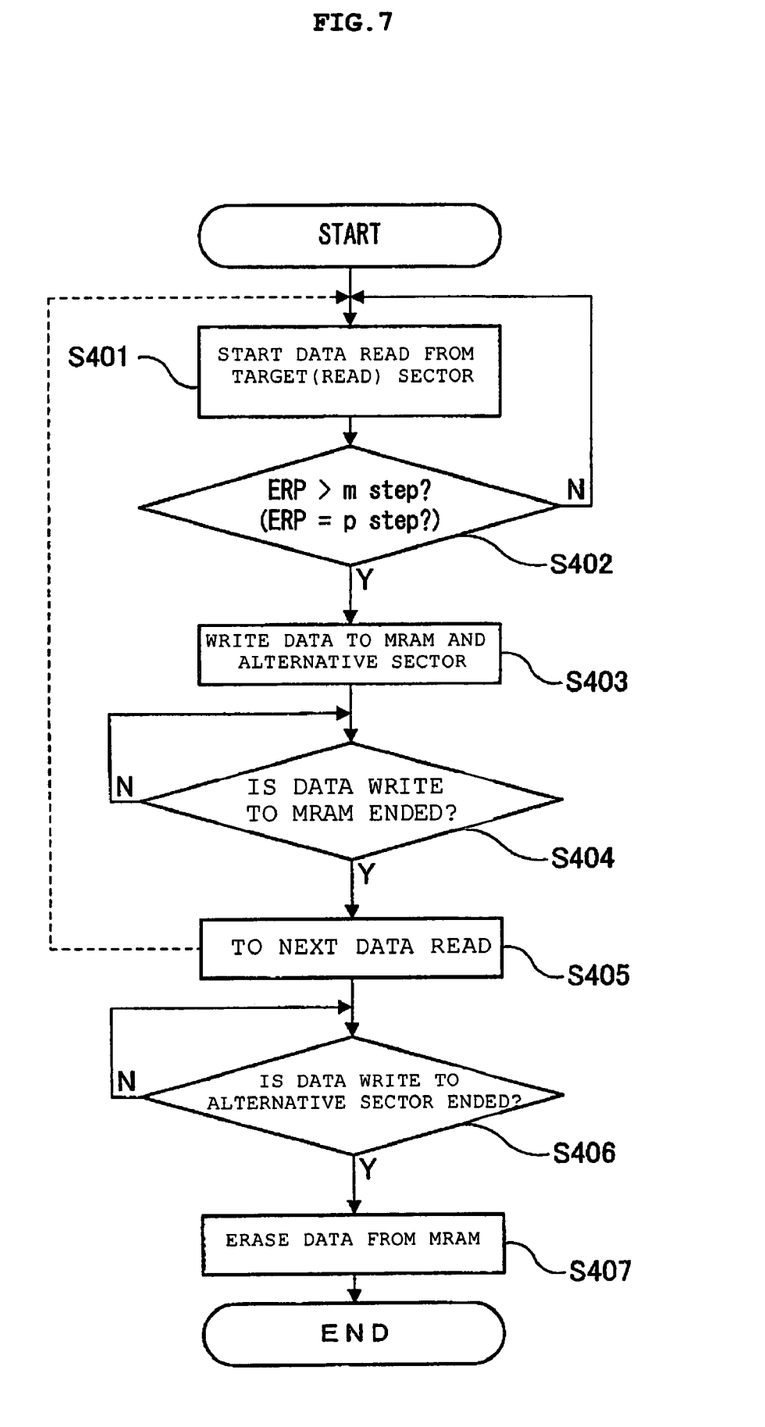
FIG. 7 is a flowchart showing a data read process in Embodiment 2.

FIG. 7 is a flowchart explaining a data read operation from the hard disk 90.

First, a predetermined sector of the normal sectors 91 in the normal sector area A of the hard disk 90 is set as the target sector (read) 91*c* (corresponding to an objective sector), and data stored in this target sector (read) 91*c* is started to be read therefrom (Step S401).

Next, it is determined whether or not the number of steps of ERP generated in the case of the data read from the target sector (read) 91*c* has exceeded the defined value m defined previously (Step S402).

Here, when the number of steps of the ERP exceeds the defined value m, data to be read from the target sector (read) 91*c* is written to the MRAM 18 and to a predetermined alternative sector (corresponding to another sector, that is, the alternative sector 93*a* in the outside alternative sector area Y in this embodiment) (Step S403). Specifically, the data to be written to the target sector (write) 91*a* is re-assigned simultaneously to the MRAM 18 and the alternative sector 93*a*. In this case, the write action of the data to the MRAM 18 and the alternative sector 93*a* is notified to the HDC 11.

By these Steps S401 to S403, the process for recording the data to the MRAM 18 (corresponding to the non-volatile memory) and the alternative sector 93*a* (corresponding to another sector) of the hard disk 90 (corresponding to the disk-shaped recording medium) will be executed when it is difficult to read the data from the target sector (read) 91*c* (corresponding to the objective sector) of the hard disk 90.

On the other hand, when the number of steps of the ERP is equal to/less than the defined value m, the process returns to Step S401, and the data read from the next target sector (read) 91*d* is started.

Next, it is determined whether or not the data write to the MRAM 18 among the data write thereto and to the alternative sector 93*a* has been ended (Step S404). If the data write to the MRAM 18 is ended, the process returns to Step S401, and the data read from the next target sector (write) 91*b* is started (Step S405). On the other hand, if the data write is not ended, the end of the data write is awaited. Note that the data write to the alternative sector 93*a* goes on as it has been.

By these Steps S404 and S405, a process for starting to read/write the data from/to the next target sector (write) 91*b* (corresponding to the next objective sector) of the hard disk 90 (corresponding to the disk-shaped recording medium) will be executed without awaiting the recording completion of the data to the target sector (write) 91*a* (corresponding to the objective sector) after recording the data to the MRAM 18 (corresponding to the non-volatile memory).

Then, in a state where the data write to the MRAM 18 has been ended and the data read from the next target sector (read) 91*d* has been started, it is determined whether or not the write to the alternative sector 93*a* has been ended (Step S406). When the data write to the alternative sector 93*a* has been ended, the data is erased from the MRAM 18 (Step S407), and the re-assign operation is ended. On the other hand, when the data write to the alternative sector 93*a* has not been ended, the end of the data write is awaited.

By these Steps S406 and S407, a process for erasing the data recorded to the MRAM 18 (corresponding to the non-volatile memory) will be executed after recording the data to the alternative sector 93*a* (corresponding to another sector) of the hard disk 90 (corresponding to the disk-shaped recording medium).

In this embodiment, the following constitution has been adopted. When it is difficult to read data from the target sector (read) 91*c* of the hard disk 90, the read data is written to the alternative sector 93*a* as well as to the MRAM 18. At the time when the data write to the MRAM 18 is ended, the data read from the next target sector (read) 91*d* is started, and the data write to the alternative sector 93*a* is made to go on in the background of the above data read. Here, the data write speed to the MRAM 18 is significantly higher than the data write speed to the hard disk 90. Therefore, a time required for storing the data in the MRAM 18 can be saved. Consequently, the latency becomes extremely short, and an instantaneous lowering in performance can be controlled.

Moreover, the data is written to the MRAM 18 and the alternative sector 93*a*, whereby the data write to the alternative sector 93*a* can be progressed to some extent at the time when the data write to the MRAM 18 is ended. Therefore, the time for the data write to the alternative sector 93*a* in the background of the data read operation from the next target sector (read) 91d can be shortened, thus making it possible to further control the instantaneous lowering in performance.

Note that a step (for example, p-th step) in which a very special data read condition (condition where the data read is difficult) is set may be registered beforehand in the respective steps of the ERP as shown by the equation in the parentheses of Step S402 in FIG. 7, and the data write to the MRAM 18 and the alternative sector 93a may be allowed when the data read succeeds under the read condition in this p-th step.

Here, in Embodiments 1 and 2, the MRAM 18 has been used as the non-volatile memory for once storing therein the data difficult to be written to the hard disk 90 or to be read therefrom. However, the memory to be used in the present invention is not limited to this. For example, the memory may be appropriately selected from a polymer memory, a phase memory and the like, which have a higher write speed than that in the hard disk 90.

Moreover, in Embodiments 1 and 2, description has been made for the example of the hard disk drive apparatus 1. However, the recording medium to be used in the present invention is not limited to this. For example, it is also possible to apply the present invention to the removable disk drive 61 attached to the HOST 60. In this case, as the removable disk 62, it is possible to adopt a disk-shaped recording medium other than the magnetic disk, for example, such as an optical disk including a DVD and as a magneto optical disk including a MO, both of which are data rewritable. Moreover, the disk-shaped recording medium to be used in the present invention is not limited to the fixed type hard disk described in Embodiments 1 and 2. As a matter of course, the recording medium may be a disk-shaped recording medium detachable from the HOST 60.

As described above, according to the present invention, the instantaneous lowering in performance of the apparatus which occurs when performing the re-assign can be controlled.

Aspects of the invention are exemplified in the following entries:

Entry 1. A method for re-assigning data, comprising the steps of:
recording data to a non-volatile memory when read/write of the data from/to a predetermined objective sector of a disk-shaped recording medium is difficult;
detecting any error in the objective sector from/to which the read/write of the data is difficult; and
recording, to another sector of the disk-shaped recording medium, the data recorded in the non-volatile memory when there is any error in the objective sector.

Entry 2. The method for re-assigning data according to entry 1, further comprising the step of: recording, to the objective sector of the disk-shaped recording medium, the data recorded to the non-volatile memory when there is no error in the objective sector.

Entry 3. The method for re-assigning data according to entry 2, further comprising the step of: starting read/write of data from/to a next objective sector of the disk-shaped recording medium without waiting for a recording completion of the data to the objective sector after the data is recorded to the non-volatile memory.

Entry 4. A method for re-assigning data, comprising the steps of:
recording data to a non-volatile memory and another sector than a predetermined objective sector of a disk-shaped recording medium when read/write of the data from/to the objective sector is difficult; and
erasing the data recorded to the non-volatile memory after recording the data to the another sector of the disk-shaped recording medium.

Entry 5. The method for re-assigning data according to any one of entries 1 and 4, further comprising the step of: starting read/write of data from/to a next objective sector of the disk-shaped recording medium without waiting for a recording completion of the data to the another sector after the data is recorded to the non-volatile memory.

Entry 6. The method for re-assigning data according to any one of entries 1 and 4, wherein a determination is made as to whether the read/write of the data from/to the predetermined objective sector of the disk-shaped recording medium is difficult based on the number of steps of ERP (Error Recovery Procedures) executed for the objective sector.

Entry 7. An apparatus for recording data, comprising:
primary re-assign means for recording data to a non-volatile memory when read/write of the data from/to a predetermined objective sector of a disk-shaped recording medium is difficult;
error detecting means for detecting any error in the objective sector from/to which the read/write of the data is difficult; and
secondary re-assign means for recording, to another sector of the disk-shaped recording medium, the data recorded in the non-volatile memory when an error of the objective sector is detected by the error detecting means.

Entry 8. The apparatus for recording data according to entry 7, further comprising: rerecording means for recording, to the objective sector of the disk-shaped recording medium, the data recorded to the non-volatile memory when any error in the objective sector is not detected by the error detecting means.

Entry 9. The apparatus for recording data according to entry 7, wherein the error detecting means and the secondary re-assign means operate in a background of any of data processing for another objective sector of the disk-shaped recording medium and an idle state of the disk-shaped recording medium.

Entry 10. An apparatus for recording data, comprising:
recording means for recording data to a non-volatile memory and another sector than a predetermined objective sector of a disk-shaped recording medium when read/write of the data from/to the objective sector is difficult; and
data erasing means for erasing the data recorded to the non-volatile memory after recording the data to the another sector of the disk-shaped recording medium.

Entry 11. The apparatus for recording data according to entry 10, wherein the recording means operates in a background of any of data processing for the another objective sector of the disk-shaped recording medium and an idle state of the disk-shaped recording medium.

Entry 12. An apparatus for recording data, comprising:
a disk-shaped recording medium including a plurality of sectors from/to which data is readable/writable; and
a non-volatile memory for temporarily recording data thereto when read/write of the data from/to a predetermined objective sector of the disk-shaped recording medium is difficult, the non-volatile memory being provided as an alternative area for the data read/written from/to the disk-shaped recording medium.

Entry 13. The apparatus for recording data according to entry 12, wherein the non-volatile memory has a higher data write speed than the disk-shaped recording medium.

Entry 14. The apparatus for recording data according to entry 12, wherein the non-volatile memory has a greater recording capacity than the recording capacity of a unit sector of the disk-shaped recording medium.

Entry 15. The apparatus for recording data according to entry 12, wherein the non-volatile memory is a magnetic random access memory (MRAM).

Entry 16. The apparatus for recording data according to entry 12, wherein the non-volatile memory is formed in a semiconductor device for controlling any of an operation of the disk-shaped recording medium and a read/write operation for the data from/to the disk-shaped recording medium.

Entry 17. A program for allowing a computer to realize:
a function of recording data to a non-volatile memory when read/write of the data from/to a predetermined objective sector of a disk-shaped recording medium is difficult;
a function of detecting any error of the objective sector from/to which the read/write of the data is difficult; and
a function of recording, to another sector of the disk-shaped recording medium, the data recorded to the non-volatile memory when there is any error in the objective sector.

Entry 18. A program for allowing a computer to realize:
a function of recording data to a non-volatile memory and another sector than a predetermined objective sector of a disk-shaped recording medium when read/write of the data from/to the objective sector is difficult; and
a function of erasing the data recorded to the non-volatile memory after recording the data to the another sector of the disk-shaped recording medium.

Although the preferred embodiments of the present invention have been described in detail, it should be understood that various changes, substitutions and alternations can be made therein without departing from spirit and scope of the inventions as defined by the appended claims.

What is claimed is:

1. A method for re-assigning data, comprising:
determining if writing first data to a predetermined objective sector of a disk-shaped recording medium is difficult;
and if so:
responsive to determining that writing the first data to a predetermined objective sector of a disk-shaped recording medium is difficult, recording the first data to a non-volatile memory, and
detecting any error in the objective sector;
and, if an error is detected in the objective sector, recording, to another sector of the disk-shaped recording medium, the first data recorded in the non-volatile memory.

2. The method of claim 1, further comprising: recording, to the objective sector of the disk-shaped recording medium, the first data recorded to the non-volatile memory, if there is no error in the objective sector.

3. A method for re-assigning data, comprising:
recording first data to a non-volatile memory, if writing the first data to a predetermined objective sector of a disk-shaped recording medium is difficult;
detecting any error in the objective sector;
recording, to another sector of the disk-shaped recording medium, the first data recorded in the non-volatile memory, if there is an error in the objective sector; and
starting writing additional data to a next objective sector of the disk-shaped recording medium without waiting for completion of recording the first data to the objective sector after the first data is recorded to the non-volatile memory.

4. A method for re-assigning data, comprising:
determining if reading first data from a pre-determined objective sector of a disk-shaped recording medium is difficult;
responsive to determining that reading the first data from a predetermined objective sector of a disk-shaped recording medium is difficult, recording the first data to a non-volatile memory and an additional sector of the disk-shaped recording medium; and
erasing the first data recorded to the non-volatile memory after recording the first data to the additional sector of the disk-shaped recording medium.

5. A method for re-assigning data, comprising:
recording first data to a non-volatile memory and an additional sector of a disk-shaped recording medium when reading the first data from an objective sector is difficult; and
erasing the first data recorded to the non-volatile memory after recording the first data to the additional sector of the disk-shaped recording medium; and
starting reading additional data from a next objective sector of the disk-shaped recording medium without waiting for completion of recording the first data to the additional sector.

6. A method for writing data, comprising:
starting to write first data to a first target sector; and
determining whether a number of ERP steps exceeds a predetermined value n;
and if not:
starting writing second data to a next target sector;
and if so:
writing the first data to a non-volatile memory, wherein the first data is written to the non-volatile memory after starting to write the first data to the first target sector and responsive to determining that the number of ERP steps exceeds the predetermined value n; and
determining if writing the first data to the non-volatile memory has ended, and if so:
performing a media check for the first target sector; and
determining whether any error exists in the first target sector,
and if not:
writing the first data to the first target sector;
and if so:
writing the first data to an alternative sector.

7. The method of claim 6, further comprising starting writing the second data to the next target sector if it is determined that writing the first data to the non-volatile memory is completed.

8. The method of claim 6, further comprising erasing the first data from the non-volatile memory after writing the first data to the first target sector or the alternative sector.

9. The method of claim 6, further comprising:
determining whether a registered ERP step, q, has been generated, and if so, writing the first data to the non-volatile memory.

10. The method of claim 6, further comprising starting writing the second data to the next target sector without waiting for completion of recording the first data to the first target sector after writing the first data to the non-volatile memory.

11. A method for writing data, comprising:
starting to write first data to a first target sector; and
determining whether a number of ERP steps exceeds a predetermined value n,
and if not:
starting writing second data to a next target sector;
and if so:
writing the first data to a non-volatile memory wherein the first data is written to the non-volatile memory after starting to write the first data to the first target sector and responsive to determining that the number of ERP steps exceeds the predetermined value n; and
determining if writing the first data to the non-volatile memory has ended, and if so:
starting writing the second data to the next target sector;
performing a media check for the first target sector; and
determining whether any error exists in the first target sector,
and if not:
writing the first data to the first target sector; and
erasing the first data from the non-volatile memory;
and if so:
writing the first data to an alternative sector; and
erasing the first data from the non-volatile memory.

12. The method of claim 11, further comprising:
determining whether a registered ERP step, q, has been generated, and if so:
writing the first data to the non-volatile memory; and
determining if writing the first data to the non-volatile memory has ended, and if so:
starting writing the second data to the next target sector;
performing a media check for the first target sector; and
determining whether any error exists in the first target sector;
and if not:
writing the first data to the first target sector, and
erasing the first data from the non-volatile memory;
and if so:
writing the first data to an alternative sector; and
erasing the first data from the non-volatile memory.

13. The method of claim 11, wherein if it is determined that the number of ERP steps exceeds the predetermined value n, the operation of starting writing the second data to the next target sector is performed without waiting for completion of writing the first data to the alternative sector after writing the first data to the non-volatile memory.

14. A method for writing data, comprising:
starting to write first data to a first target sector; and
determining whether a number of ERP steps exceeds a predetermined value n,
and if not:
starting writing second data to a next target sector;
and if so:
writing the first data to a non-volatile memory wherein the first data is written to the non-volatile memory after starting to write the first data to the first target sector and responsive to determining that the number of ERP steps exceeds the predetermined value n;
writing the first data to an alternative sector; and
determining if writing the first data to the non-volatile memory has ended, and if so:
starting writing the second data to the next target sector; and determining if writing the first data to the alternative sector has ended;
and if so, erasing the first data from the non-volatile memory.

15. The method of claim 14 further comprising:
determining whether a registered ERP step, q, has been generated, and if so:
writing the first data to the non-volatile memory; and
writing the first data to the alternative sector.

16. The method of claim 14, wherein if it is determined that the number of ERP steps exceeds the predetermined value n, the operation of starting writing the second data to the next target sector is performed without waiting for completion of writing the first data to the alternative sector after writing the first data to the non-volatile memory.

17. A method for reading data, comprising:
reading first data from a first target sector; and
determining whether a number of ERP steps exceeds a predetermined value m,
and if not:
starting reading second data from a next target sector;
and if so:
writing the first data read from the first target sector to a non-volatile memory, wherein the first data is written to the non-volatile memory responsive to determining that the number of ERP steps exceeds the predetermined value m; and
determining if writing to the non-volatile memory has ended, and if so:
starting reading second data from the next target sector;
performing a media check for the first target sector; and
determining whether any error exists in the first target sector,
and if not:
erasing the non-volatile memory;
and if so:
writing the first data stored in the non-volatile memory to an alternative sector; and
erasing the non-volatile memory.

18. The method of claim 17, further comprising:
determining whether a registered ERP step, p, has been generated, and if so, writing the first data read from the target sector to the non-volatile memory.

19. The method of claim 17, wherein if it is determined that the number of ERP steps exceeds the predetermined value m, the operation of starting reading the second data to the next target sector is performed without waiting for completion of writing the first data to the alternative sector after writing to the non-volatile memory has ended.

20. A method for reading data, comprising:
reading first data from a first target sector; and
determining whether the number of ERP steps exceeds a predetermined value m,
and if not:
starting reading second data from a next target sector;
and if so:
writing the first data read from the first target sector to a non-volatile memory, wherein the first data is written to the non-volatile memory responsive to determining that the number of ERP steps exceeds the predetermined value m;
writing the first data read from the first target sector to an alternative sector; and
determining if writing the first data read from the first target sector to the non-volatile memory has ended, and if so:

starting reading the second data from the next target sector; and determining if writing the first data read from the first target sector to the alternative sector has ended;

and if so, erasing the first data from the non-volatile memory.

21. The method of claim 20, further comprising:

determining whether a registered ERP step, p, has been generated, and if so:

writing the first data read from the first target sector to the non-volatile memory; and writing the first data read from the first target sector to the alternative sector.

22. The method of claim 20, wherein if it is determined that the number of ERP steps exceeds the predetermined value m, the operation of starting reading the second data to the next target sector is performed without waiting for completion of writing the first data to the alternative sector after writing the first data read from the first target sector to the non-volatile memory has ended.

23. A storage medium embodying a computer executable program for performing a method for writing data, wherein the method comprises the following operations:

starting to write first data to a first target sector; and determining whether a number of ERP steps exceeds a predetermined value n;

and if not:

starting writing second data to a next target sector;

and if so:

writing the first data to a non-volatile memory wherein the first data is written to the non-volatile memory after starting to write the first data to the first target sector and responsive to determining that the number of ERP steps exceeds the predetermined value n; and determining if writing the first data to the non-volatile memory has ended, and if so:

performing a media check for the first target sector; and determining whether any error exists in the first target sector, and if not:

writing the first data to the first target sector;

and if so:

writing the first data to an alternative sector.

24. The storage medium of claim 23, wherein the method further comprises starting writing the second data to the next target sector if it is determined that writing the first data to the non-volatile memory is completed.

25. The storage medium of claim 23, wherein the method further comprises erasing the first data from the non-volatile memory after writing the first data to the first target sector or the alternative sector.

26. The storage medium of claim 23, wherein the method further comprises:

determining whether a registered ERP step, q, has been generated, and if so, writing the first data to the non-volatile memory.

27. The storage medium of claim 23, wherein the method further comprises starting writing the second data to the next target sector without waiting for completion of writing the first data to the first target sector after writing the first data to the non-volatile memory.

28. A storage medium embodying a computer executable program for performing a method for writing data, wherein the method comprises the following operations:

starting to write first data to a first target sector; and determining whether a number of ERP steps exceeds a predetermined value n, and if not:

starting writing second data to a next target sector;

and if so:

writing the first data to a non-volatile memory wherein the first data is written to the non-volatile memory after starting to write the first data to the first target sector and responsive to determining that the number of ERP steps exceeds the predetermined value n;

writing the first data to an alternative sector; and determining if writing the first data to the non-volatile memory has ended, and if so:

starting writing the second data to the next target sector; and determining if writing the first data to the alternative sector has ended;

and if so, erasing the first data from the non-volatile memory.

29. The storage medium of claim 28, wherein if it is determined that the number of ERP steps exceeds the predetermined value n, the operation of starting writing the second data to the next target sector is performed without waiting for completion of writing the first data to the alternative sector after writing the first data to the non-volatile memory.

30. A storage medium embodying a computer executable program for performing a method for reading data, wherein the method comprises the following operations:

reading first data from a first target sector; and determining whether a number of ERP steps exceeds a predetermined value m, and if not:

starting reading second data from a next target sector;

and if so:

writing the first data read from the first target sector to a non-volatile memory, wherein the first data is written to the non-volatile memory responsive to determining that the number of ERP steps exceeds the predetermined value m; and determining if writing to the non-volatile memory has ended, and if so:

starting reading second data from the next target sector;

performing a media check for the first target sector; and determining whether any error exists in the first target sector, and if not:

erasing the non-volatile memory;

and if so:

writing the first data stored in the non-volatile memory to an alternative sector; and erasing the non-volatile memory.

31. The storage medium of claim 30, wherein if it is determined that the number of ERP steps exceeds the predetermined value m, the operation of starting reading the second data to the next target sector is performed without waiting for completion of writing the first data to the alternative sector after writing the first data to the non-volatile memory.

32. A storage medium embodying a computer executable program for performing a method for reading data, wherein the method comprises the following operations:

reading first data from a first target sector; and determining whether the number of ERP steps exceeds a predetermined value m, and if not:

starting reading second data from a next target sector;

and if so:

writing the first data read from the first target sector to a non-volatile memory, wherein the first data is written to the non-volatile memory responsive to determining that the number of ERP steps exceeds the predetermined value m;

writing the first data read from the first target sector to an alternative sector; and determining if writing the first data read from the first target sector to the non-volatile memory has ended, and if so:

starting reading the second data from the next target sector; and determining if writing the first data read from the first target sector to the alternative sector has ended;

and if so, erasing the first data from the non-volatile memory.

33. A data storage apparatus, comprising:

a non-volatile memory;

a disk drive having a first target sector, a next target sector, and an alternative sector;

a processing unit coupled to the non-volatile memory and the disk drive, wherein the processing unit is configured to perform the following operations:

starting to write first data to the first target sector; and determining whether a number of ERP steps exceeds a predetermined value n;

and if not:

starting writing second data to the next target sector;

and if so:

writing the first data to the non-volatile memory, wherein the first data is written to the non-volatile memory after starting to write the first data to the first target sector and responsive to determining that the number of ERP steps exceeds the predetermined value n; and determining if writing the first data to the non-volatile memory has ended, and if so:

performing a media check for the first target sector; and determining whether any error exists in the first target sector, and if not:

writing the first data to the first target sector;

and if so:

writing the first data to the alternative sector.

34. The data storage apparatus of claim 33, wherein the non-volatile memory comprises MRAM.

35. A data storage apparatus, comprising:

means for starting to write first data to a first target sector;

means for determining whether a number of ERP steps exceeds a predetermined value n;

means for starting writing second data to a next target sector;

means for writing the first data to a non-volatile memory, wherein the first data is written to the non-volatile memory after starting to write the first data to the first target sector and responsive to determining that the number of ERP steps exceeds the predetermined value n;

means for determining if writing the first data to the non-volatile memory has ended;

means for performing a media check for the first target sector;

means for determining whether any error exists in the first target sector;

means for writing the first data to the first target sector; and means for writing the first data to an alternative sector.

* * * * *